US008456716B2

(12) United States Patent
Watanabe et al.

(10) Patent No.: US 8,456,716 B2
(45) Date of Patent: Jun. 4, 2013

(54) LIGHT SOURCE UNIT, OPTICAL SCANNER INCLUDING SAME, AND IMAGE FORMING APPARATUS INCLUDING THE OPTICAL SCANNER

(75) Inventors: Kazunori Watanabe, Tama (JP); Hiroshi Johno, Zama (JP)

(73) Assignee: Ricoh Company, Ltd., Tokyo (JP)

( * ) Notice: Subject to any disclaimer, the term of this patent is extended or adjusted under 35 U.S.C. 154(b) by 452 days.

(21) Appl. No.: 12/767,995

(22) Filed: Apr. 27, 2010

(65) Prior Publication Data

US 2010/0309277 A1 Dec. 9, 2010

(30) Foreign Application Priority Data

Jun. 3, 2009 (JP) .................................. 2009-134050

(51) Int. Cl.
*H04N 1/04* (2006.01)
*G06F 3/12* (2006.01)
*G01D 15/14* (2006.01)
*B41J 27/00* (2006.01)
*B41J 2/435* (2006.01)
*G06K 9/00* (2006.01)
*G02B 26/08* (2006.01)
*G09G 1/00* (2006.01)
*F21S 8/00* (2006.01)

(52) U.S. Cl.
USPC ............ 358/475; 358/481; 358/480; 358/1.1; 358/474; 347/224; 347/244; 347/225; 347/258; 347/250; 382/100; 359/204.1; 359/198.1; 359/205.1; 178/15; 362/277

(58) Field of Classification Search
USPC ............... 347/224, 244, 235, 263; 359/204.1, 359/198.1; 358/481, 480, 1.1; 178/15
See application file for complete search history.

(56) References Cited

U.S. PATENT DOCUMENTS

| 4,230,902 | A | * | 10/1980 | Hug et al. ........................ 178/15 |
| 7,446,917 | B2 | | 11/2008 | Tomita et al. |
| 2002/0001118 | A1 | * | 1/2002 | Nakajima et al. ............. 359/204 |
| 2008/0225349 | A1 | | 9/2008 | Watanabe |
| 2009/0009826 | A1 | | 1/2009 | Watanabe |
| 2009/0295899 | A1 | | 12/2009 | Watanabe et al. |
| 2010/0033787 | A1 | | 2/2010 | Serizawa et al. |

FOREIGN PATENT DOCUMENTS

| JP | 9-33761 A | 2/1997 |
| JP | 11-97800 A | 4/1999 |
| JP | 3648391 B2 | 2/2005 |
| JP | 2006-133655 A | 5/2006 |
| JP | 2007-206682 A | 8/2007 |
| JP | 2009-230031 A | 10/2009 |

* cited by examiner

*Primary Examiner* — Charlotte M. Baker
*Assistant Examiner* — Rury Grisham
(74) *Attorney, Agent, or Firm* — Dickstein Shapiro LLP

(57) ABSTRACT

A light source unit includes a holder, a light source, coupling lens, and a support member. The light source is supported by the holder and projects a light beam against a target. The coupling lens adjusts an optical axis of the light beam. The support member contacts the holder and the coupling lens to fix the coupling lens in place on the holder after the coupling lens adjusts the optical axis of the light beam. The holder and the coupling lens are adhered to the support member using an adhesive agent. An optical scanner includes a rotary deflector to deflect and scan the light projected from the light source unit, a scan optical element to focus the light deflected by the rotary deflector, and the light source unit. An image forming apparatus includes the optical scanner.

13 Claims, 4 Drawing Sheets

LIGHT SOURCE UNIT, OPTICAL SCANNER INCLUDING SAME, AND IMAGE FORMING APPARATUS INCLUDING THE OPTICAL SCANNER

CROSS-REFERENCE TO RELATED APPLICATIONS

This patent application is based on and claims priority pursuant to 35 U.S.C. §119 from Japanese Patent Application No. 2009-134050, filed on Jun. 3, 2009 in the Japan Patent Office, which is hereby incorporated herein by reference in its entirety.

BACKGROUND OF THE INVENTION

1. Field of the Invention

Exemplary aspects of the present invention generally relate to a light source unit, an optical scanner including the light source unit, and an image forming apparatus including the optical scanner.

2. Description of the Background Art

Conventionally, known image forming apparatuses such as a digital copier, a facsimile machine, and a printer include an optical scanner that illuminates a latent image bearing member, such as a photoreceptor, with light to form a latent image on the surface of the latent image bearing member. The light projected from the optical scanner scans the latent image bearing member in accordance with image data. Then, the latent image is developed with toner to form an image.

Generally, such an optical scanner includes optical elements such as a coupling lens, an aperture, a cylindrical lens, a polygon scanner, a focusing lens, and so forth. The coupling lens forms a light flux projected from the light source into parallel rays of light. The aperture shapes the parallel rays of light from the coupling lens into a desired shape. The cylindrical lens transforms the light into a line image. The polygon scanner serves as a deflector that deflects the light. The focusing lens focuses the light deflected by the polygon scanner on the surface of the latent image bearing member.

The optical scanner also includes a synchronous detection device that determines a start position for light to start writing. The optical elements and the synchronous detection device are enclosed in a single optical housing.

The coupling lens not only forms the light flux from the light source into parallel rays of light, but also adjusts an optical axis of the light flux. In particular, the coupling lens adjusts any divergence of the light flux from the light source, any positioning error of the light source, and any variation in the point of light projection in order to obtain an optimum parallel light flux and an optimum position for the optical axis. For this reason, in general, the position of the coupling lens cannot be fixed in advance, and thus the coupling lens is not positioned by a positioning member. Consequently, the coupling lens is fixed to a holder using an adhesive agent after the above-described adjustment is performed.

Although advantageous, since the coupling lens is not fixed by the positioning member but is adhered to the holder using the adhesive agent, the position of the coupling lens fluctuates due to degradation of the adhesive agent over time and expansion/contraction of the adhesive agent caused by environmental changes including, but not limited to, fluctuations in temperature.

Such fluctuation of the position of the coupling lens causes the position of the optical axis to shift undesirably. Further, divergence of transmitted light fluctuates, thus resulting in fluctuation of a focal point, which then causes fluctuation of the position of the light beam on a scanned surface, color drift, and degradation of dot reproduction. Ultimately, the latent image cannot be formed properly.

In order to address such a difficulty, in one related-art approach, an adhesive agent is applied to a certain area (an adhesive agent application area) of the coupling lens. The adhesive agent application area is formed on a portion of the peripheral surface of the coupling lens. The projected length of an adhesive layer formed on the adhesive agent application area is longer in a sub-scanning direction (a horizontal direction) than a main scanning direction (a vertical direction). With this configuration, an amount of shift of the coupling lens in the sub-scanning direction is less than in the main scanning direction, thereby reducing an amount of shift in the pitch of the scan line on the scanned surface.

Although advantageous, there is a drawback to such a configuration in that, because the position of the coupling lens is fixed by the adhesive agent without a positioning member, the position of the coupling lens is not securely fixed. In other words, the coupling lens can still move due to degradation of the adhesive agent over time and as well as due to expansion/contraction of the adhesive agent caused by environmental changes, for example, fluctuations in temperature. Therefore, a more secure positioning method is required.

SUMMARY OF THE INVENTION

In view of the foregoing, in one illustrative embodiment of the present invention, a light source unit includes a holder, a light source, a coupling lens, and a support member. The light source is supported by the holder and projects a light beam against a target. The coupling lens is disposed in proximity to the light source and adjusts an optical axis of the light beam. The support member contacts the holder and the coupling lens to position and fix the coupling lens in place on the holder after the coupling lens adjusts the optical axis of the light beam. The holder and the coupling lens are adhered to the support member using an adhesive agent.

In another illustrative embodiment of the present invention, an optical scanner includes the light source unit, a rotary deflector, and a scan optical element. The rotary deflector deflects and scans the light projected from the light source unit. The scan optical element focuses the light deflected by the rotary deflector.

Yet in another illustrative embodiment of the present invention, an image forming apparatus includes an image bearing member, a developing device, a transfer device, a fixing device, and the optical scanner. The image bearing member bears an electrostatic latent image on a surface thereof. The developing device develops the electrostatic latent image formed on the image bearing member using toner to form a toner image. The transfer device transfers the toner image onto the recording medium. The fixing device fixes the toner image.

Additional features and advantages of the present invention will be more fully apparent from the following detailed description of illustrative embodiments, the accompanying drawings and the associated claims.

BRIEF DESCRIPTION OF THE DRAWINGS

A more complete appreciation of the disclosure and many of the attendant advantages thereof will be readily obtained as the same becomes better understood by reference to the following detailed description of illustrative embodiments when considered in connection with the accompanying drawings, wherein.

DETAILED DESCRIPTION OF ILLUSTRATIVE EMBODIMENTS

Figure 1:
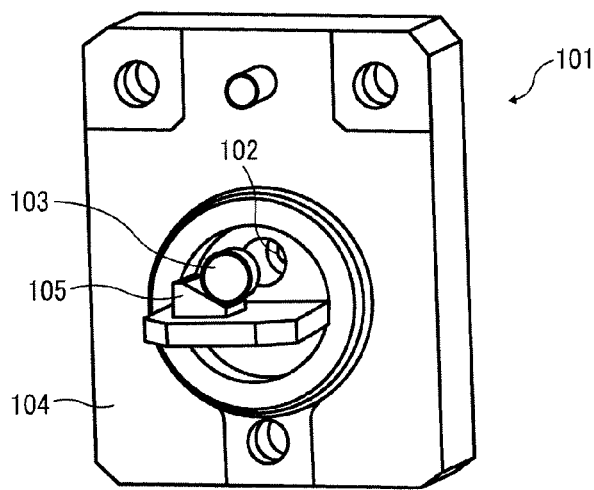
FIG. 1 is a schematic diagram illustrating a light source unit of an optical scanner according to a first illustrative embodiment of the present invention.

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In a later-described comparative example, illustrative embodiment, and alternative example, for the sake of simplicity of drawings and descriptions, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but includes other printable media as well.

Figure 7:
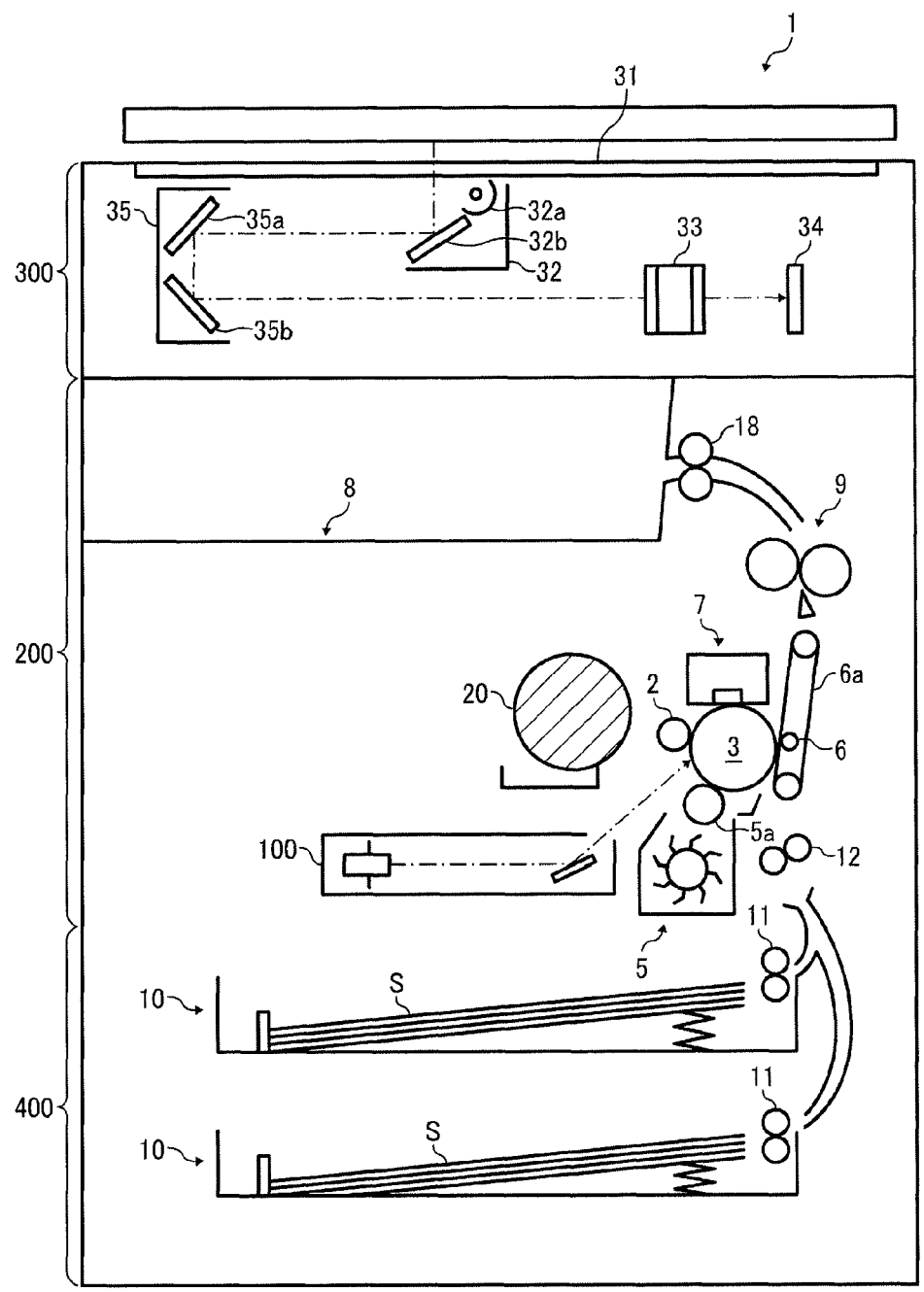
FIG. 7 is a cross-sectional schematic diagram illustrating an image forming apparatus according to an illustrative embodiment of the present invention.

Referring now to the drawings, wherein like reference numerals designate identical or corresponding parts throughout the several views, and initially to FIG. 7, one example of an image forming apparatus according to an illustrative embodiment of the present invention is described.

FIG. 7 is a cross-sectional schematic diagram illustrating an image forming apparatus 1 according to the illustrative embodiment. The image forming apparatus 1 includes an image forming unit 200, an image reading unit 300, and a sheet feed unit 400.

In FIG. 7, the image forming unit 200 includes a photoreceptor 3 serving as an image bearing member, a charging device 2, a developing device 5 serving as a developing mechanism, a transfer-transport belt 6a, a transfer roller 6, a cleaning device 7, a developing device 9, a toner bottle 20, an optical scanner 100, and so forth. The cleaning device 7 cleans the photoreceptor 3. The optical scanner 100 forms/writes an electrostatic latent image on the photoreceptor 3. The transfer roller 6 is disposed facing the photoreceptor 3 via the transfer-transport belt 6a. The transfer roller 6 and the photoreceptor 3 meet the transfer-transport belt 6a to form a so-called transfer nip. The toner bottle 20 stores toner to supply to the developing device 5 as the toner in the developing device 5 is consumed.

The sheet feed unit 400 is disposed substantially below the image forming unit 200. The sheet feed unit 400 includes sheet feed cassettes 10, each of which provided with a sheet feed roller 11. Each of the sheet feed cassettes 10 stores a stack of recording media sheets S. The sheet feed roller 11 picks up and feeds the recording media sheets S one sheet at a time.

The recording medium S fed by the sheet feed roller 11 temporarily stops at a pair of registration rollers 12 disposed before the photoreceptor 3. The recording medium S is fed synchronously with rotation of the photoreceptor 3 in appropriate timing such that the leading edge of the image formed on the photoreceptor 3 and the leading edge of the recording medium S arrive at the transfer nip defined by the photoreceptor 3 and the transfer roller 6 substantially at the same time.

The fixing device 9 is disposed substantially at the upper portion of the image forming unit 200. The fixing device 9 includes two rollers 9a facing each other through a sheet transport path for the recording medium S. The place where the two rollers 9a meet and press against each other is a so-called fixing nip.

Sheet discharge rollers 18 are disposed downstream in the sheet transport direction of the recording medium S in the fixing device 9. The sheet discharge rollers 18 discharge the recording medium passed through the fixing nip onto a sheet discharge tray 8.

Substantially above the fixing device 9 of the image forming unit 200, the reading unit 300 is disposed to read a document, not illustrated, placed on a contact glass 31. The image reading unit 300 includes a first carriage 32, a second carriage 35, a lens 33, and a CCD 34. The first carriage 32 includes a first mirror 32b and a light source 32a for illuminating the document. The second carriage 35 includes a second mirror 35a and a third mirror 35b.

The CCD 34 is disposed behind the lens 33. Image data of the document scanned by the first carriage 32 and the second carriage 35 is read by the CCD 34 as an image signal. The image signal is converted to a digital value and image-processed by the CCD 34. As will be described later in detail, based on the image-processed signal, the optical scanner 100 projects light against the photoreceptor 3 and scans the surface of the photoreceptor 3 to form an electrostatic latent image on the surface of the photoreceptor 3.

Next, a description is provided of an image forming operation of the image forming apparatus 1. While the photoreceptor 3 rotates, the photoreceptor 3 is charged uniformly by the charging device 2. The optical scanner 100 is driven based on the image data received from an external electronic device, thereby forming an electrostatic latent image on a charged area (image forming area) of the photoreceptor 3. Subsequently, the developing device 5 develops the electrostatic latent image on the photoreceptor 3 with a developing agent, that is, toner, supplied from a developing roller 5a. Accordingly, a visible image, also known as a toner image is formed on the photoreceptor 3.

While the toner image is formed on the photoreceptor 3, a sheet of recording medium S is picked up by the sheet feed roller 11 of the sheet feed cassette 10 selected from a plurality of the sheet feed cassettes 10 and transported to the pair of the registration rollers 12. The leading edge of the recording medium S contacts and stops temporarily at a nip portion where the pair of the registration rollers 12 meets and presses against each other.

Rotation of the registration rollers 12 resumes in appropriate timing such that the toner image on the photoreceptor 3 and the recording medium S are aligned. The recording medium S is sent to the transfer nip defined by the photoreceptor 3 and the transfer roller 6 where the toner image on the photoreceptor 3 is transferred onto the recording medium S.

After the toner image is transferred onto the recording medium S, electric charge on the recording medium S is removed by a charge neutralizing brush, not illustrated. The charge neutralizing brush contacts the recording medium S to remove the charge therefrom.

After the charge is removed from the recording medium S, the recording medium S is separated from the photoreceptor 3 and sent to the fixing device 9.

In the fixing device 9, the recording medium S is sandwiched by the rollers 9a, thereby heating and pressing the recording medium S. Accordingly, the toner image is fixed onto the recording medium S. The recording medium S on which the toner image is fixed is discharged onto the sheet discharge tray 8 by the sheet discharge rollers 18.

The residual toner remaining on the photoreceptor 3 after the transfer process is removed from the photoreceptor 3 by the cleaning device 7 and recovered.

The foregoing description pertains to an operation of a copier as one example of the image forming apparatus in which the image data of the document placed on the contact glass 31 is read by the reading unit 300, and an image is formed based on the image data. The image forming apparatus is not limited to the copier, but includes a printer in which an image is formed based on image data received from external electronic devices such as a personal computer (PC).

Referring now to FIG. 1, a description is now provided of a light source unit 101 employed in the optical scanner 100 according to the illustrative embodiment of the present invention.

In FIG. 1, the light source unit 101 includes a light source 102, a coupling lens 103, a holder 104, and a support member 105 serving as a positioning member. The holder 104 supports the light source 102 and the coupling lens 103. The support member 105 positions the coupling lens 103 in place with respect to the holder 104.

In the light source unit 101, the coupling lens 103 adjusts the position of an optical axis of a light flux of scattered light projected from the light source 102 and converts the scattered light into parallel rays of light.

Accuracy of adjustment of the position of the optical axis and the divergence (parallelism) of the light flux after passing through the coupling lens 103 depend also on characteristics of an optical system positioned after the coupling lens 103. Nevertheless, fine adjustment of the position of the optical axis in units of μm is still required of the coupling lens 103. An error in the adjustment of the position of the optical axis and fluctuation of the position over time result in misalignment of the scan position and degradation of a shape of light beam on the scanned surface.

In view of the above, the light source 102 is press-fitted into a hole formed in the holder 104 and fixed thereto so that the position of the light source 102 is retained on the holder 104.

The position of the coupling lens 103 is determined by the light flux projected from the light source 102 positioned on the holder 104. Part-to-part variations in the position of the hole formed on the holder 104, the position of the point of light projection, and divergence of the light flux projected from the light source 102 are absorbed through adjustment of the position of the coupling lens 103.

Figure 2:
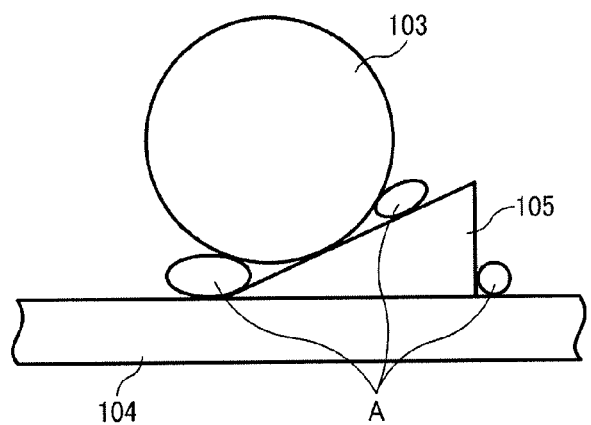
FIG. 2 is a schematic diagram illustrating positioning of a coupling lens on a holder of the light source unit of FIG. 1.

As illustrated in FIG. 2, the support member 105 is disposed so as to contact the holder 104 and the coupling lens 103 after adjustment of the position of the coupling lens 103, and adhered to the coupling lens 103 and the holder 104 by an adhesive agent A. Accordingly, the position of the coupling lens 103 is fixed. FIG. 2 is a schematic diagram illustrating positioning of the coupling lens 103 on the holder 104.

Because the position of the coupling lens 103 is determined after absorbing part-to-part variations in the position of the hole of the holder 104 and the light projection point of the light flux from the light source 102, and divergence of the light flux as described above, the position of the coupling lens 103 on the holder 104 varies unit to unit. In other words, the position of the coupling lens 103 on the holder 104 varies among different light source units.

As illustrated in FIG. 2, the support member 105 has a wedge-like shape. With this configuration, even if the space between the coupling lens 103 and the holder 104 varies unit to unit, the coupling lens 103 can still be positioned in place by simply adjusting the position of the support member 105 to contact the coupling lens 103 and the holder 104. The wedge-like shape of the support member 105 provides greater flexibility in positioning the coupling lens 103 relative to the holder 104.

According to the illustrative embodiment described above, the coupling lens 103 is positioned in place and fixed even after adjustment of the light flux passing through the coupling lens 103. Thus, positional variations over time and due to expansion/contraction of the adhesive agent A can be reduced, if not prevented entirely.

The coupling lens 103, the holder 104, and the support member 105 share at least one of multiple points of adhesion in common.

With this configuration, deterioration of the characteristics of the light beam is prevented. In other words, the characteristics similar to, if not the same as those of the initial adjustment, can be maintained for an extended period of time.

Embodiment 2

Figure 3:
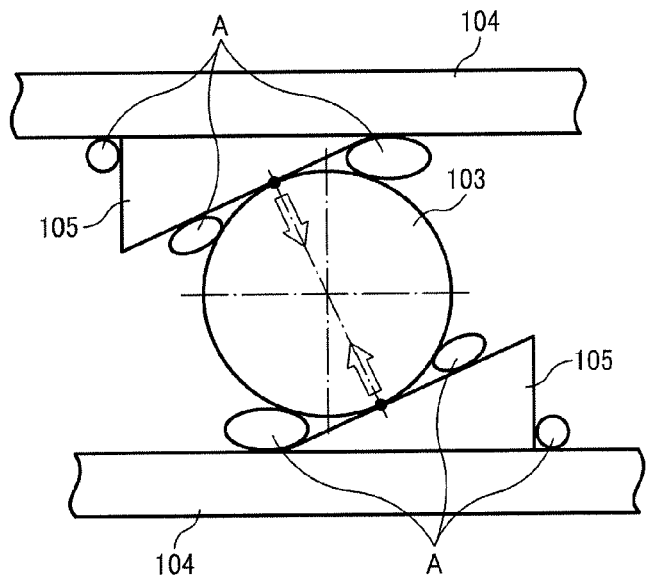
FIG. 3 is a schematic diagram illustrating a second illustrative embodiment of a light source unit structure according to the present invention.

Referring now to FIG. 3, there is provided a schematic diagram illustrating a second illustrative embodiment of the positioning structure of the present invention. In the present embodiment, a plurality of support members 105, for example, two support members 105 are used, and the holder 104 includes two support member attachment surfaces, each provided at the top and the bottom of the holder 104.

The support members 105 are provided such that after adjusting the coupling lens 103, each of the support members 105 contacts the coupling lens 103 and the holder 104 to fix the position of the coupling lens 103.

As illustrated in FIG. 3, the position of the support members 105 is adjusted such that a line indicated by arrows in FIG. 3 that connects contact points of the coupling lens 103 and the support members 105 passes through a substantially center of the coupling lens 103. With this configuration, even if some force is applied to the coupling lens 103 due to a slight change in the position of the support members 105, the force is cancelled out at the opposing contact point of the coupling lens 103 and the support member 105. Therefore, the position of the coupling lens 103 is reliably secured.

Embodiment 3

Figure 4:
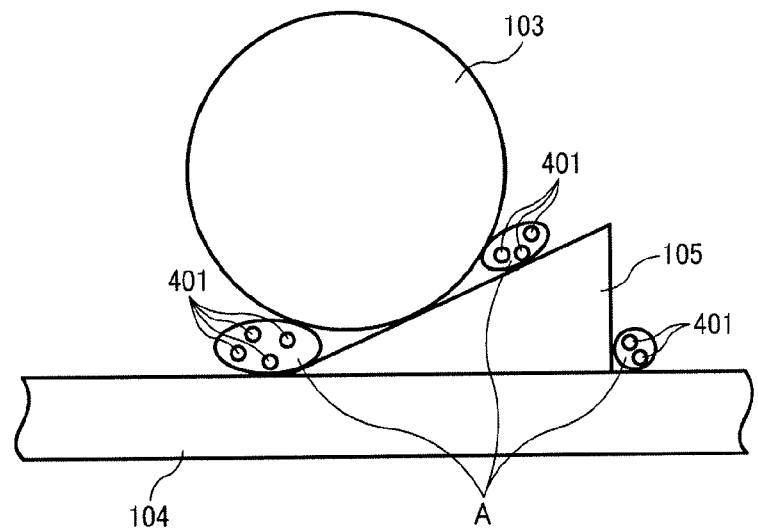
FIG. 4 is a schematic diagram illustrating a third illustrative embodiment of a light source unit structure according to the present invention.

Referring now to FIG. 4, there is provided a schematic diagram illustrating a third illustrative embodiment of the positioning structure of the present invention. In the present embodiment, the adhesive agent A includes an additive 401 which is made from material different from the adhesive agent A. Materials suitable for the additive 401 include, but are not limited to, glass and acrylic resin.

Environmental changes including, but not limited to fluctuations of temperature in the light source unit 101, can cause the adhesive agent A to deform. In particular, the adhesive agent A expands and contracts. According to the present embodiment, the actual volume of the adhesive agent A is reduced by adding the additive 401 to the adhesive agent A so that an external force against the coupling lens 103, generated by the fluctuation of the volume of the adhesive agent A, is reduced.

Furthermore, an advantage of this configuration is that reducing the actual volume of the adhesive agent A by adding the additive 401 can reduce deformation or expansion/contraction of the adhesive agent A, thereby reducing the external force against the coupling lens 103 generated caused by environmental changes without reducing a contact area of the adhesive agent A relative to the coupling lens 103 and the support member 105.

In particular, the smaller the linear expansion coefficient of the additive 401 relative to the adhesive agent A is, the more the external force against the coupling lens 103 can be reduced.

By reducing the external force generated by the fluctuation of the volume of the adhesive agent A, the position of the coupling lens 103 can be reliably fixed over time. With this configuration, even if some environmental changes, for example, fluctuations in temperature, deterioration of the characteristics of the coupling lens 103 is prevented. In other words, characteristics similar to if not the same as those of the initial adjustment can be reliably maintained.

In FIG. 4, although the additive 401 is illustrated as having a spherical shape, the additive 401 is not limited to the spherical shape. Thus, the additive 401 may have a bar-shape, a plate-like shape, or a pulverized shape. Furthermore, the material of the additive 401 is not particularly limited. However, it is preferable to use a substantially transparent material when the adhesive agent A is a photocurable adhesive agent.

As the linear expansion coefficient of the additive 401 is less than that of the adhesive agent A, the amount of expansion of the additive 401 due to environmental changes such as fluctuations of temperature is less than that of the adhesive agent A, thereby reducing the external force against the coupling lens 103 generated by the expansion of the adhesive agent A. This configuration is advantageous in that, even if environmental changes occur, for example, the temperature fluctuates, deterioration of the characteristics of the coupling lens 103 is prevented. In other words, characteristics of the coupling lens 103 similar to those at the initial adjustment can be reliably maintained, thereby reliably maintaining the characteristics of the light beam.

Furthermore, when the linear expansion coefficients of the holder 104 and the support member 105 are substantially the same, the amount of expansion and contraction of the holder 104 and the support member 105 is substantially the same even when environmental changes occur, thereby reliably maintaining the relative position of the light source 102 and the coupling lens 103. When the relative position of the light source 102 and the coupling lens 103 is maintained, deterioration of the characteristics of the light beam is prevented. In other words, characteristics of the light beam similar to those at the initial adjustment is maintained reliably even if the temperature in the light source unit 100 fluctuates.

When the linear expansion coefficient of the support member 105 is greater than that of the adhesive agent A, the fluctuation of the position of the coupling lens 103 due to environmental changes including, but not limited to☐ fluctuations of temperature, is greater than when the coupling lens 103 is fixed only by the adhesive agent A.

By contrast, when the linear expansion coefficient of the support member 105 is less than that of the adhesive agent A, the fluctuation of the position of the coupling lens 103 due to environmental changes is less than when the support member 105 is fixed by only the adhesive agent A.

Therefore, it is advantageous that the linear expansion coefficient of the support member 105 be less than that of the adhesive agent A in terms of the fluctuation of the position of the coupling lens 103.

Embodiment 4

Figure 5:
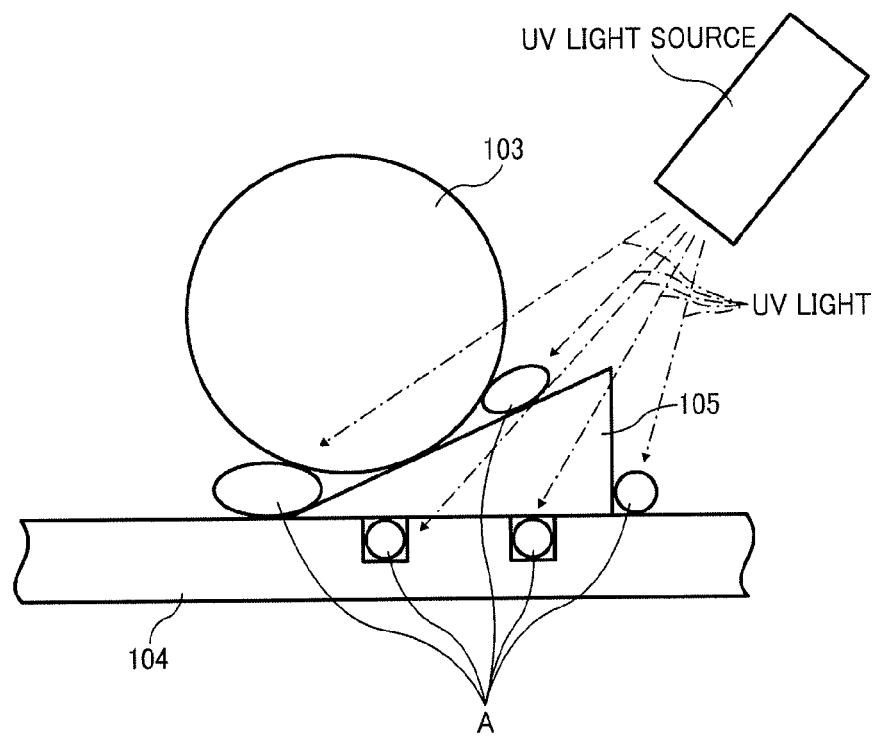
FIG. 5 is a schematic diagram illustrating a fourth illustrative embodiment of a light source unit structure according to the present invention.

Referring now to FIG. 5, there is provided a schematic diagram illustrating a fourth illustrative embodiment of the positioning structure of the present invention. According to the present embodiment, the support member 105 is formed of substantially transparent material. The material has a relatively high transmittance relative to an electromagnetic wave having a wavelength equal to or less than 1 μm. For example, the transmittance relative to the electromagnetic wave having the wavelength equal to or less than 1 μm is equal to or greater than 10%.

This configuration allows use of a photocurable resin as the adhesive agent A, thereby providing greater flexibility in choosing the application area of the adhesive agent A that fixes the support member 105. Consequently, the adhesive agent A can firmly fix the coupling lens 103, and thus deterioration of the characteristics of the light beam can be prevented. In other words, the characteristics of the light beam, similar to, if not the same as those of the light beam at the initial adjustment can be reliably maintained.

Because the coupling lens 103 is substantially transparent to transmit the light from the light source 102, all three devices including the coupling lens 103, the support member 105, and the holder 104, can be fixed by a single radiation of the electromagnetic wave. Accordingly, productivity is enhanced.

Embodiment 5

Figure 6:
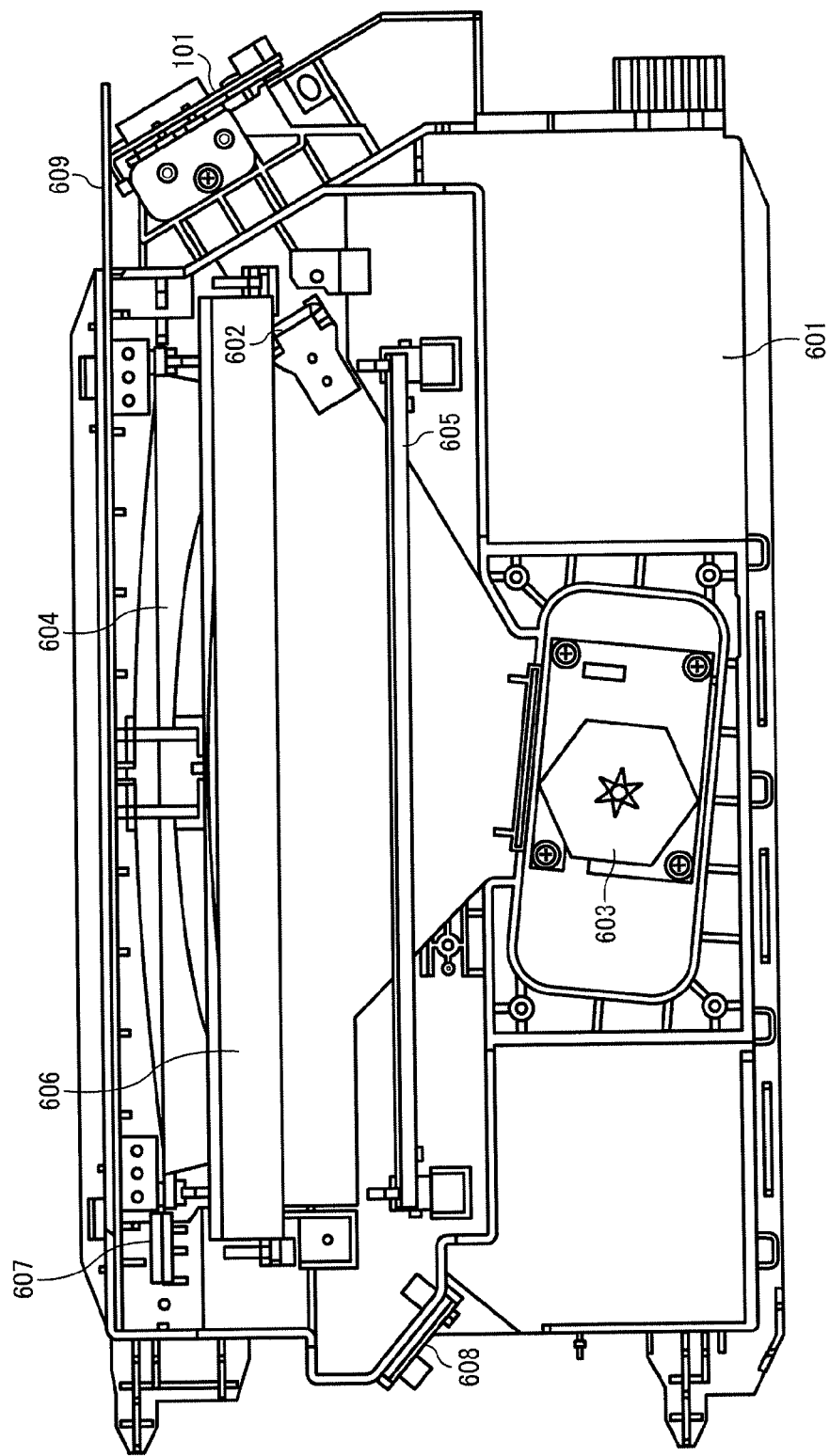
FIG. 6 is a schematic diagram illustrating an optical scanner according to an illustrative embodiment of the present invention.

Referring now to FIG. 6, there is provided a schematic diagram illustrating a fifth illustrative embodiment of the present invention. FIG. 6 illustrates the optical scanner using the light source unit 101 according to the foregoing embodiments.

As illustrated in FIG. 6, the optical scanner includes the light source unit 101, an optical housing 601, a cylindrical lens 602, a polygon scanner 603 serving as a deflector that deflects light projected from the light source unit 101, a scan optical element 604 such as a scan lens and a scan mirror, a reflective mirror 605, a correction lens 606, a reflective mirror 607, a synchronous detection plate 608, and a dust-proof glass 609.

According to the present embodiment, the characteristics of the light flux projected from the light source unit 101, similar to those at the initial adjustment, are reliably maintained. Accordingly, deterioration of the optical characteristics such as the position of the optical axis on the scanned surface of the optical scanner and the beam spot diameter is prevented.

FIG. 6 illustrates one example of the optical scanner according to the illustrative embodiments. However, the light source unit 101 is not limited to the one shown in FIG. 6. Alternatively, a plurality light source units 101 are provided to a single optical scanner.

According to the illustrative embodiments, the support member 105 positions the coupling lens 103 in place. However, the support member 105 can be used to position not only the coupling lens 103 in place. Alternatively, the support member 105 can be used to position optical elements that necessitate positional adjustment and are fixed by the adhesive agent A after adjustment. Such optical elements includes, but are not limited to, a cylindrical lens, a wave plate, a spectral element, a liquid crystal optical element, a scan lens, a reflective mirror, and so forth.

According to the illustrative embodiment, as described above, a light source unit includes a light source that projects a light beam, a coupling lens, and a holder that supports the light source and the coupling lens. After the position of the coupling lens is adjusted properly relative to the light source, the support member contacts the holder and the coupling lens, and the coupling lens, the holder, and the support member are adhered by the adhesive agent A. The coupling lens contacts the support member, and the support member contacts the holder, thereby fixing the position of the coupling lens relative to the holder after the position of the coupling lens 103 is adjusted properly.

With this configuration, fluctuation of the position of the coupling lens can be suppressed, if not prevented entirely over time. Furthermore, the optical axis of the light flux from the light source can be adjusted at a proper position. As a result, the light flux from the light source can be shaped to a desired shape so that a predetermined beam spot diameter can be reliably obtained in the light source unit.

Still further, upon environmental changes or change over time, deterioration of the characteristics of the light beam is prevented. In other words, the characteristics of the light beam, similar to, if not the same as the characteristics at the initial adjustment, can be reliably maintained.

According to the illustrative embodiment, the position of the coupling lens is adjusted relative to the light source. After adjustment of the position of the coupling lens, the support member having a wedge-like shape contacts the holder and the coupling lens, and the coupling lens, the support member, and the holder are adhered and fixed by an adhesive agent.

The support member having a wedge-like shape can accommodate part-to-part variations in fluctuation of the position of the light source, the mounting position of the coupling lens, and so forth. In particular, using the support member, the position of the coupling lens is adjustable so as to achieve desired characteristics of the optical beam.

Furthermore, even when the relative position of the holder and the coupling lens varies unit to unit, the coupling lens is properly positioned relative to the holder by simply adjusting the position of the support member. The wedge-like shape support member provides greater flexibility in positioning of the coupling lens. As a result, the characteristics of the light beam at the initial adjustment are reliably maintained.

According to the illustrative embodiment, a plurality of the support members may be provided in the light source unit. The plurality of the support members provides greater reliability in fixation of the position of the coupling lens, thereby preventing more reliably deterioration of the characteristics of the light beam. In other words, the characteristics of the light beam at the initial adjustment can be maintained.

According to the illustrative embodiment, after the position of the coupling lens is adjusted relative to the light source, the holder and the coupling lens contact two wedge-like shaped support members and are adhered to the support members by the adhesive agent in the light source unit. Two support members are provided such that the line that connects the contact points of the coupling lens and the support members passes through the substantially center of the coupling lens.

With this configuration, even if some external force is applied to the coupling lens due to slight fluctuation of the position of the support member, the external force is cancelled out because one of the support members is provided opposite the other support member. Accordingly, fluctuation of the position of the coupling lens is prevented, thereby reliably preventing deterioration of the characteristics of the light beam.

According to the illustrative embodiment, the coupling lens, the support member, and the holder are adhered and fixed by the adhesive agent at a plurality of places. The coupling lens, the holder, and the support member share at least one of multiple points of adhesion in common. With this configuration, the number of points of adherence is reduced, thereby enhancing productivity.

If the coupling lens is fixed by being adhered only to the support member, the position of the coupling lens easily fluctuates when the position of the support member fluctuates. By contrast, when the coupling lens, the holder, and the support member share at least one of multiple points of adhesion in common, even when the position of the support member fluctuates, the coupling lens remains fixed to the holder, thereby preventing fluctuation of the coupling lens.

According to the illustrative embodiment, the adhesive agent includes an additive made from material different from the adhesive agent. With this configuration, the volume of the adhesive agent is reduced, thereby reducing expansion/contraction of the adhesive agent, while the coupling lens, the support member, and the holder are adhered and fixed without reducing the adherence area. Accordingly, fluctuation of the position of the coupling lens is prevented, thereby reliably preventing deterioration of the characteristics of the light beam.

According to the illustrative embodiment, the adhesive agent includes an additive made from material different from the adhesive agent and having the linear expansion coefficient substantially less than that of the adhesive agent. When the linear expansion coefficient of the additive is less than the adhesive agent, the expansion of the additive due to temperature change is less than the expansion of the adhesive agent, thereby reducing an external force against the coupling lens. Accordingly, fluctuation of the position of the coupling lens is prevented, thereby reliably preventing deterioration of the characteristics of the light beam.

According to the illustrative embodiment, the holder and the support member have substantially the same linear expansion coefficient. The advantage of this configuration is that even if environmental changes occur, for example, the temperature fluctuates, an amount of expansion and contraction of the holder and that of the support member are the same so that the relative position of the light source and the coupling lens can be maintained. Accordingly, fluctuation of the position of the coupling lens is prevented, thereby reliably preventing deterioration of the characteristics of the light beam.

According to the illustrative embodiment, the support member is formed of material having the linear expansion coefficient substantially less than that of the adhesive agent. If the linear expansion coefficient of the support member is greater than the adhesive agent, the fluctuation of the coupling lens due to environmental changes is greater than when the coupling lens is fixed only by the adhesive agent.

By contrast, if the linear expansion coefficient of the support member is less than the adhesive agent, the fluctuation of the coupling lens due to environmental changes is smaller than when the coupling lens is fixed only by the adhesive agent. Therefore, it is advantageous that the linear expansion coefficient of the support member be less than the adhesive agent.

According to the illustrative embodiment, the support member is substantially transparent and has the transmittance equal to or greater than 10% relative to the electromagnetic wave having the wavelength equal to or less than 1 μm.

When the photocurable resin is used for the adhesive agent, the electromagnetic wave that cures the resin can penetrate the support member. Therefore, the adherence location of the holder relative to the coupling lens and the holder can be arbitrarily selected. With this configuration, the coupling lens can be firmly fixed, thereby reliably maintaining the characteristics of the light beam.

Furthermore, because the coupling lens is substantially transparent to allow the light flux from the light source to penetrate therethrough, all three devices including the coupling lens, the support member, and the holder can be fixed by a single radiation of the electromagnetic wave. Accordingly, productivity can be enhanced.

The present invention can be employed in an optical scanner equipped with the light source unit according to the illustrative embodiments, a rotary deflector and a scan lens that focuses the light scanned by the rotary deflector. With this configuration, the optimum characteristics of the light beam at the initial adjustment is maintained even when the temperature changes and/or over time. Accordingly, the optical characteristics including the position of the optical axis on the scanned surface and the beam spot diameter can be reliably maintained.

Such an optical scanner can be employed in an image forming apparatus. Because the performance of the optical scanner described above is not deteriorated by environmental changes or over time, the image forming apparatus including the optical scanner can produce a high-quality image.

According to the illustrative embodiment, the present invention is employed in the image forming apparatus. The image forming apparatus includes, but is not limited to, a digital copier, a printer, a facsimile machine, and a digital multi-functional system including at least two of these functions thereof.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Still further, any one of the above-described and other exemplary features of the present invention may be embodied in the form of an apparatus, method, or system.

For example, any of the aforementioned methods may be embodied in the form of a system or device, including, but not limited to, any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. A light source unit, comprising:
a holder;
a light source supported by the holder, to project a light beam against a target;
a coupling lens to adjust an optical axis of the light beam; and
a support member, having a substantially wedge-like shape, to contact the holder and the coupling lens to fix the coupling lens in place on the holder after the coupling lens adjusts the optical axis of the light beam, the holder and the coupling lens adhered to the support member using an adhesive agent;
wherein the support member includes a first surface and a second surface, and a substantially acute angle is formed between the first surface and the second surface; and
wherein the coupling lens contacts the first surface and the holder contacts the second surface.

2. The light source unit according to claim 1, wherein the support member has a transmittance equal to or greater than 10% relative to an electromagnetic wave having a wavelength equal to or less than 1 μm.

3. The light source unit according to claim 1, comprising a plurality of support members.

4. The light source unit according to claim 3, wherein the plurality of support members are disposed such that a line that connects contact points of the coupling lens and the support members passes through substantially a center of the coupling lens.

5. The light source unit according to claim 1, wherein the holder and the coupling lens are adhered to the support member at multiple points of adhesion using the adhesive agent, and the coupling lens, the holder, and the support member share at least one of multiple points of adhesion in common.

6. The light source unit according to claim 1, wherein the adhesive agent includes an additive.

7. The light source unit according to claim 6, wherein a linear expansion coefficient of the additive is less than that of the adhesive agent.

8. The light source unit according to claim 6, wherein the additive includes glass.

9. The light source unit according to claim 6, wherein the additive includes acrylic resin.

10. The light source unit according to claim 1, wherein a linear expansion coefficient of the holder and that of the support member are substantially the same.

11. The light source unit according to claim 1, wherein the linear expansion coefficient of the holder is less than that of the adhesive agent.

12. An image forming apparatus, comprising:
- an image bearing member to bear an electrostatic latent image on a surface thereof;
- a developing device to develop the electrostatic latent image foil led on the image bearing member using toner to form a toner image;
- a transfer device to transfer the toner image onto the recording medium;
- a fixing device to fix the toner image; and
- an optical scanner, comprising:
  - a light source unit to project light;
  - a rotary deflector to deflect and scan the light projected from the light source unit; and
  - a scan lens to focus the light deflected by the rotary deflector, the light source unit including
    - a holder;
    - a light source supported by the holder, to project a light beam against a target;
    - a coupling lens supported by the holder, to adjust an optical axis of the light beam; and
    - a support member, having a substantially wedge-like shape, to contact the holder and the coupling lens to fix the coupling lens in place on the holder after the coupling lens adjusts the optical axis of the light beam, the holder and the coupling lens adhered to the support member using an adhesive agent;
  - wherein the support member includes a first surface and a second surface, and a substantially acute angle is formed between the first surface and the second surface; and
  - wherein the coupling lens contacts the first surface and the holder contacts the second surface.

13. An optical scanner, comprising:
- a light source unit to project light;
- a rotary deflector to deflect and scan the light projected from the light source unit; and
- a scan optical element to focus the light deflected by the rotary deflector, the light source unit including
  - a holder;
  - a light source supported by the holder, to project a light beam against a target;
  - a coupling lens to adjust an optical axis of the light beam; and
  - a support member, having a substantially wedge-like shape, to contact the holder and the coupling lens to fix the coupling lens in place on the holder after the coupling lens adjusts the optical axis of the light beam, the holder and the coupling lens adhered to the support member using an adhesive agent;
- wherein the support member includes a first surface and a second surface, and a substantially acute angle is formed between the first surface and the second surface; and
- wherein the coupling lens contacts the first surface and the holder contacts the second surface.

* * * * *